United States Patent [19]
Stoy et al.

[11] Patent Number: 5,149,052
[45] Date of Patent: Sep. 22, 1992

[54] PRECISION MOLDING OF POLYMERS

[75] Inventors: Vladimir A. Stoy; George P. Stoy, both of Princeton, N.J.

[73] Assignee: Kingston Technologies, Inc., Dayton, N.J.

[21] Appl. No.: 120,947

[22] Filed: Nov. 16, 1987

[51] Int. Cl.⁵ .............................. B22C 9/08
[52] U.S. Cl. ...................... 249/105; 249/144; 249/160; 264/2.2; 425/808
[58] Field of Search ............ 249/105, 113, 134, 141, 249/144, 160; 264/1.1, 2.2, 2.6; 425/130, 543, 808

[56] References Cited

U.S. PATENT DOCUMENTS

| | | | |
|---|---|---|---|
| 3,902,693 | 9/1975 | Crandon et al. | 249/134 |
| 4,042,552 | 8/1977 | Grucza | 264/1.1 X |
| 4,197,266 | 4/1980 | Clark et al. | 264/2.2 |
| 4,347,198 | 8/1982 | Ohkada et al. | 264/2.6 X |
| 4,614,630 | 9/1986 | Pluim | 249/134 X |
| 4,698,089 | 10/1987 | Matsuzaka et al. | 425/808 X |

*Primary Examiner*—Charles Hart
*Attorney, Agent, or Firm*—Kenneth P. Glynn

[57] ABSTRACT

A method and apparatus for precision molding soluable polymers is disclosed, in order to form an exact and precisely shaped product, such as contact lenses and surgical implants. A preferred mold for forming contact lenses includes a female part having an indentation and a sharp circumferential edge surrounding the indentation. The mold also includes a male part which is adapted to contact the sharp circumferential edge of the female part to form the molding cavity between the indentation of the female part and the male part. A semi-permeable gate is formed between the female part and the male part for introducing coagulating fluid into the molding cavity while preventing the escape of the polymer solution from the molding cavity. The semi-permeable gate allows the diffusion of the coagulating fluid into the molding cavity at a faster rate than the rate of diffusion of solvent out of the molding cavity. The polymer solution is coagulated by the influx of the coagulating fluid into the polymer solution which causes both the coagulation and swelling of the polymer solution. Swelling of the polymer solution coagulates the solution under pressure within the molding cavity to form a precisely shaped product. Coagulation proceeds under pressure since the solvent diffuses out of the semi-permeable gate at a slower rate than the diffusion of the coagulating fluid into the molding cavity.

11 Claims, 3 Drawing Sheets

PRECISION MOLDING OF POLYMERS

BACKGROUND OF THE INVENTION

1. Field of the Invention

This invention relates to the molding of soluble polymers to form molded products having precise tolerances, such as, contact lenses, surgical implants and other precisely shaped articles.

2. Background of the Related Art

Injection molding of molten plastics is a highly reproducible and cost effective method of manufacturing articles which must be precisely shaped to exacting tolerances. Some polymers, however, possessing highly desirable characteristics cannot be melted and injection molded. These include covalently cross-linked polymers, such as thermosets which cannot be melted or dissolved. They also include polymers with very strong physically cross-linked bonding which can be dissolved but cannot be melted. The physically cross-linked polymers include cellulose and its derivatives, aromatic polyamides, fully aromatic polyesters, polyacrylonitrile and ceratin block copolymers, including block copolymers having hydrogel character. The thermosets include hydrogels, which require special processing to be formed into precisely shaped products, such as contact lenses, surgical implants and other products.

The problems associated with the processing of thermosets are illustrated when dealing with covalently cross-linked hydrogels. Covalently crosslinked hydrogels, such as the polymer product of 2-hydroxyethylmethacrylate, crosslinked copolymers of acrylamide, vinylpyrrolidone, glycerylacrylate and methacrylic acid, are thermosets formed by copolymerization of their hydrophilic monomers with certain crosslinking monomers having two or more polymerizable double bonds. Since these polymers are covalently crosslinked, they are inherently insoluble and unmeltable. Therefore, they have to be polymerized in a final configuration, or polymerized into a blank which is subsequently shaped by mechanical means, such as lathing, grinding, polishing and the like.

Polymerization is a very sensitive process which is strongly influenced by several factors, including the presence of trace amounts of atmospheric oxygen, U.V. and other short-wave radiation, and by traces of impurities in the starting materials. Polymerization is also influenced by small, but unavoidable variations in the concentration of monomers and intiators of the polymerization process. These variables cause articles formed by polymerization molding techniques to vary from article to article and from batch to batch to a much greater extent then articles formed by injection molding techniques. Also, polymerization is accompanied by a decrease in volume, since almost all polymers have a higher density than the parent monomers. The decrease in volume during polymerization as a rule, is in the range of 10 to 20%. These factors make the polymerization and precise molding of products, directly in molds, a very costly procedure which is difficult to control and which results in a great deal of waste.

These difficulties become apparent in the manufacture of soft contact lenses which require very well defined surfaces. The shapes of the contact lens surface are extremely critical at the optical zones and edges, and must be free from surface defects, overflows, sharp edges or protrusions. Accordingly, in order to polymerize soft contact lenses into a final configuration, the mold has to have a fully enclosed, rigid molding cavity. Due to the factors outlined above however, and especially since the volume of the polymer is decreased from about 10 to 20% during polymerization, bubbles, vacuales and other defects are found in the molded product.

Many of the problems in molding hydrogels into contact lenses were solved by various processes, some of which are described by Larson, et al in U.S. Pat. No. 4,680,336. Generally, these processes included various combinations of the following methods:

1. A lens is lathed from hard, anhydrous hydrogel ("xerogel") to form a blank prepared in a separate polymerization step. The xerogel lens is then swelled to its final size. This method is widely used, but is rather expensive. Also, the individually manufactured lenses exhibit variations from lens to lens.

2. A mixture of monomer is polymerized in an open mold which is spun along its vertical axis. The anterior surface of the lens is formed by its contact with the mold, while the posterior surface is formed into an approximately paraboloid shape by the interplay of surface and centrifugal forces. This method solves some f the problems very elegantly, but its use is restricted to limited symmetrical shapes and to certain hydrogels.

3. Polymerization of the hydrogel monomer is carried out in a mold with a relatively rigid central part and softer, collapsible edges. The collapse of the edges by outside pressure diminishes the volume of the mold cavity as polymerization proceeds. One disadvantage of this method is that the edges are deformed in an unpredictable manner and must be reshaped by lathing and polishing in a separate step. Because of this reshaping step, the lens in the mold has to be formed in a machinable, i.e., xerogel state. In most cases, the mold must be disposable and the xerogel cannot be allowed to stick to the walls of the mold.

The methods which use machining of the lens in the xerogel state have several disadvantages. First, xerogel increases its volume by swelling, so that all dimensions, tolerances and defects increase in size between the xerogel and hydrogel states. The magnitude of enlargement increases with increasing water content in the final lens. Second, each lens is made from individually polymerized pieces of hydrogel, whether prepared as a blank or as a semifinished molded lens. This introduces variations in several parameters during lens production.

Problems associated with the production of other shaped hydrogel articles are similar, though usually not so critical as in the manufacture of contact lenses.

Physically cross-linked hydrogels can be used to manufacture the same types of products as covalently cross-linked hydrogels, such as contact lenses, surgical implants and the like. As a rule, physically cross-linked hydrogels have superior properties than covalently cross-linked hydrogels. By contrast to covalently cross-linked hydrogels, physically crosslinked hydrogels are water swellable polymers in which the covalent cross-links are replaced by strong physical interactions between polymer chains. Physically crosslinked hydrogels appear frequently in nature; in addition several synthetic or semisynthetic polymers of this kind have been produced, including: hydrophilic segmented polyurethanes, certain derivatives of cellulose, block copolymers of vinylacetate-vinylalcohol, block copolymers of acrylonitrile-acrylamide, based on partially hydrolyzed polyacrylonitrile, and various hydrogel derivatives to name a few.

The physically-crosslinked hydrogels have been used to manufacture fibers, membranes, coatings, powderous sorbents, beads and similar articles which do not require precision molding methods. However, prior to this invention physically crosslinked hydrogels could not be utilized to produce precise, complicated or thick-walled molded articles.

The manufacture of shaped articles, such as contact lenses or individually adjusted implants, using physically crosslinked hydrogels, all pose a number of specific problems. Although these hydrogels can be "melted" using solvents, plasticizers or melting aids, when the melt is cooled and solidified in the molding cavity, the polymer shrinks in volume, creating defects and variations in the size of the molded product. Attempts to compensate for shrinkage in the mold have not been successful. Similarly, attempts to utilize spin casting for physically crosslinked hydrogels by cooling the melts or thermoreversible gels, have not been successful.

Physically crosslinked hydrogels can be also processed by coagulating their solution using a coagulating fluid, typically water. This method is normally used, however, for production of membranes, fibers, tubings, coatings, beads and sponges. However, it has never been used to manufacture shaped articles requiring a precise or complicated shapes, such as contact lenses.

In order to effectively mold dissolved, physically crosslinked hydrogels, it is necessary to extract the solvent and coagulate the polymer without changing the volume or shape of the polymer while it is being molded. The polymer solution must be coagulated in the mold or else the resulting article would be distorted.

In addition, other polymers with strong physical bonding, including aramides (Kevlar TM) or polyacrylonitrile also have excellent mechanical properties, such as low weight, high thermal resistance and tensile strength. However, because these polymers cannot be melted, their uses have been limited to articles with shapes only obtainable by traditional solution processing methods, for example, fibers and membranes.

Prior to this invention however, there has not been a method to precisely mold physically cross-linked hydrogels. Accordingly, although physically cross-linked hydrogels have many superior properties over covalently crosslinked hydrogels, including better mechanical properties at high water content and better general processability, physically crosslinked hydrogels could not be used to form precision molded articles due to the lack of a suitable molding method.

SUMMARY OF THE INVENTION

According to the present invention, a polymer solution is fed into a cavity in a mold. The molding cavity is provided with a semi-permeable gate which allows the free diffusion of a solvent out of the mold and for the diffusion of a coagulating fluid into the mold. The coagulating fluid can be a swelling agent for the molded polymer, as is the case with hydrogels, or it can swell the molded polymer only when mixed with the solvent to be removed by diffusion. The most ideal results are obtained if the diffusion coefficient of the coagulating fluid is considerably higher than that of the solvent so that the volume of the coagulating polymer increases simultaneously with coagulation. Thus, the coagulation and molding proceeds under a positive pressure within the mold cavity so that the coagulating polymer copies the interior of the mold cavity without the problems caused by the volume contraction. Further removal of the solvent by its diffusion into the coagulating liquid does not change the exact shape of the coagulated product, only changing its size depending on the chemical composition of the polymer, its concentration in the solution, the type of solvent and coagulant used.

DETAILED DESCRIPTION OF THE PREFERRED EMBODIMENT

This invention is based on our observation that physically crosslinked hydrogels, dissolved in water-miscible solvents, temporarily increase in volume when coagulated by contact with water. If the coagulation is performed in a closed cavity, coagulation and solidification of the physically crosslinked hydrogel proceeds under a positive pressure, due to the expansion of the hydrogel. The hydrogel can thus fill the mold and copy the precise shape of the molding cavity without the problems, due to shrinkage, which are inherent in prior polymer molding methods.

We have found that the coagulation process can be used for production of shaped hydrogel articles if water has access into the mold cavity by diffusion through a semi-permeable medium. Any direct contact between the polymer solution in the mold cavity and the outside coagulation bath must be avoided, otherwise the article would become distorted at the points of contact with the outside coagulation bath.

Accordingly, our Invention includes a method for shaping of polymer solutions in molds which are permeable to water but prevent the escape of the polymer solution. Such molds are partly made from water-permeable materials such as ceramics, sintered glass, sintered metal, porous plastic, plaster of Paris, semi-permeable membrane or hydrogel. The water-permeable part of the mold is the coagulant entry gate through which the exchange of the solvent for water, the coagulant, takes place. Thus, the molding process is carried out in a mold which is permeable to water, polymer solvents or other low-molecular weight compounds but is non-permeable with respect to the polymer.

It is preferred that only a portion of the mold be water-permeable. The expansion of the polymer will then start from a limited area, designated as the "coagulant entry gate", and proceed in a selected direction into the mold cavity. Accordingly, the most critical parts of the molded article can be coagulated under the highest filling pressure. In addition, the areas of slowest coagulation, i.e., those farthest from the coagulant entry gate, are the most homogeneous and have the best mechanical properties.

A particularly preferred class of water-permeable mold materials are the hydrogels. Because certain hydrogels can be dissolved, overswollen or otherwise damaged by the solvent used in the molding process, particular attention must be paid to the design of the mold and to the concentration of solvents used in the coagulation and molding process. It is especially important that the concentration of the solvent in contact with the gate never exceeds a certain safe level. The concentration of solvent in the gate can be maintained at a safe level by using a highly permeable hydrogel with a large volume, as compared with the volume of the mold cavity, so that the hydrogel forms a sink in which the solvent is diluted.

Another way to maintain a safe concentration of solvent at the gate is to use a relatively thin layer of highly permeable hydrogel, which has one side in contact with the coagulating polymer solution, and the other side in contact with an excess of coagulating fluid.

As used herein, the term "hydrogel" is defined to mean a covalently or physically crosslinked polymeric, fluid swellable material, including an ultraporous or microporous polymeric, fluid swellable material.

Figure 1:
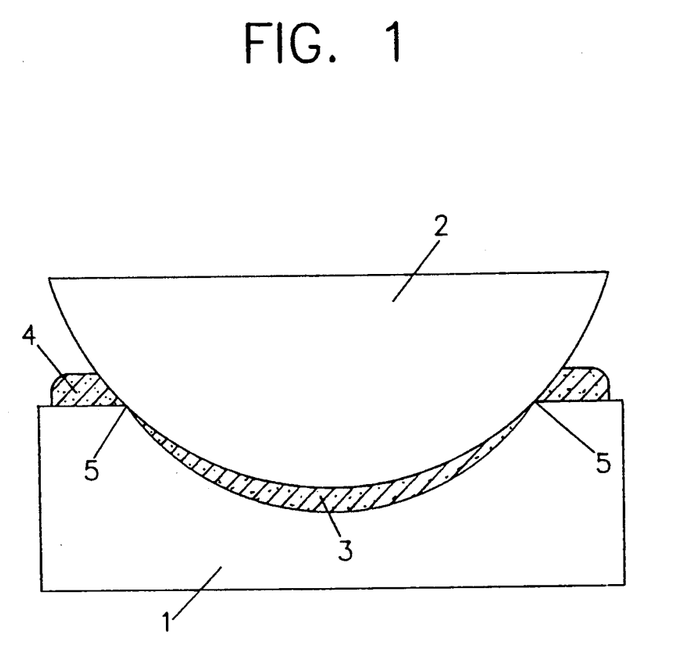
FIG. 1 is an elevational view of a vertical cross-section through a preferred contact lens mold according to this invention.

It is preferable to create the coagulant entry gate in situ by coagulating a solution of a highly permeable hydrogel in a space in the mold. The space in the mold should communicate with both the molding cavity and the outside reservoir of coagulating fluid, but should not be a part of the mold cavity or of the molded article. The permeable gate can be formed from the coagulated overflow of the hydrogel solution 4, as illustrated in FIG. 1.

The spaces from which the coagulant entry gate is formed, include filling ducts, runners, gates and areas of contacts between mold parts. However, it is important to select the location of the spaces for the coagulant entry gate where the hydrogel of the water entry gate can be easily separated from the molded product, and where eventual surface irregularities do not cause a functional problem. It is also preferred that the interface area between the mold cavity and coagulant entry gate is smaller than the cross sectional area of the coagulant entry gate.

Accordingly, when both the mold cavity and the spaces for the coagulant entry gate, e.g., the filling runner of a mold, are filled with the hydrogel solution and then immersed in an excess of the coagulating fluid, the hydrogel solution in the coagulant entry gate spaces are the first to coagulate, sealing the spaces and forming the semi-permeable coagulant entry gate. Access to the mold cavity is then possible only through the coagulant entry gate. There is no direct contact between the solution in the cavity and the coagulating liquid outside of the cavity.

We have found that the method of this Invention is particularly useful for manufacturing contact lenses. This method uses a very simple mold design, and molding process.

A mold for the production of contact lenses according to this Invention is illustrated in FIG. 1. The mold includes: a concave (female) part 1, and a convex (male) part 2. The space between parts 1 and 2 is the mold cavity 3 which has shape of the molded contact lens. The body of the female part 1 is larger than the diameter of the mold cavity 3. The space remaining between the parts 1 and 2 on the outside of mold cavity 3 forms the coagulant entry gate 4 which is filled by an excess of the coagulating polymer solution. The coagulant entry gate 4 can have numerous shapes and volumes. However, it is preferred that in forming the coagulant entry gate 4 the female part 2 comprising the bottom of the coagulant entry gate 4 is horizontal or sloped downward. This flat downward slope in female part 2 prevents the coagulant entry gate 4 from retaining a large volume of the coagulating solution making the diffusion path through the coagulant entry gate 4 as short as possible. It is also preferred that female part 1 includes a sharp cricumferential edge 5 surrounding the molding cavity. It is this sharp edge 5 which contacts male part 2 to form the molding cavity 3.

The process of manufacturing a contact lens using the mold illustrated in the FIG. 1, includes the following steps:

1. The female part 1 is filled with the polymer solution. The volume of solution metered into the mold has to be larger than the volume of the mold cavity 3. If the volume of the solution was the same or less than the volume of mold cavity 3, then the solution would either not coagulate in the subsequent process steps, if the coagulant entry gate 4 were missing, or would coagulate into an uneven shape if there was direct contact between the hydrogel solution in the cavity and the coagulating fluid.

2. Male part 2 is pressed into the female cavity 1 using adequate pressure. Adequate pressure is defined as sufficient pressure to expel excess solution from mold cavity 3, but pressure which is insufficient to damage or deform the mold or to completely seal the mold cavity 3 from the outside and prevent the formation of a coagulant entry gate 4. The adequate pressure needed for a particular application can readily be established by experimentation with each specific mold design and specific polymer solution.

3. The filled mold is placed in an excess of coagulating fluid. The coagulating fluid may include water, saline, or an aqueous solution of the solvent used in this process. Both parts of the mold are held together during the coagulation process by a sufficient pressure to prevent the mutual dislocation of the mold parts, but insufficient to deform or damage the mold or to interrupt the communication between spaces the mold cavity 3 and coagulant entry gate 4. As a rule, in the case of contact lenses, a pressure from about 1 gram to about 100 grams per mold is adequate. The molds are maintained in close contact with the coagulating fluid for a sufficient time to decrease the concentration of the solvent in the mold cavity below the concentration necessary to maintain the particular hydrogel in solution. The exact time required for solidification of the polymer solution depends on several parameters, such as the volume of mold cavity of the cross-sectional area of the coagulant entry gate space 4, the access of the coagulation entry gate to fresh coagulating fluid, the concentration gradient between the mold cavity and the coagulation liquid, and the type of the solvent used. As a rule, optimum coagulation time ranges from a few hours to a few days. However, the optimum coagulation and solidification time for each specific case is best determined by experimentations.

The composition of the coagulating liquid may have to be changed during coagulation to keep the concentration gradient at an optimum range. It is preferable to start the coagulation with a mixture of water and the solvent and to exchange the mixture to a more dilute aqueous solution of the solvent or to water in later stages of coagulation.

4. After coagulation is complete, the mold is opened and the residual solvent is washed from the molded hydrogel product in the open mold. It is preferable to press the mold parts together prior to opening the mold in order to allow the sharp circumferential edge 5 to cut and separate the hydrogel in the water entry gate from the molded hydrogel product. It is also preferable to rotate the mold parts against each other during the compression. In addition, it is also preferred to apply vibrations to the molds during the compression and/or the rotation, to further facilitate the clean cutting and separation of the hydrogel in the gate from the molded product.

It is further preferred to open the mold so that the convex surface of the mold cavity is facing upward. The lens then remains on the male part 2, which can be used as convenient stage for lens handling and quality control, such as measurement of the lens refractive power. During this step, the lens should be washed and equilibrated with an isotonic saline solution.

Another preferred process is particularly useful for production of low price articles. The process includes filling the pores of a porous mold with a coagulating fluid, and then injecting the polymer solution into the porous mold. The solution coagulates immediately on the wet surface of the mold as the cavity is filled through the filling gate.

This process is closely analogous to injection molding of polymer melts. The difference is in the mass-transfer controlled solidification in this invention, as opposed to the heat-transfer solidification in conventional injection molding. Since similar rules apply to both mass and heat transfer, the design of molds used for this invention are very similar to the dyes used for injection molding. Therefore, standard injection molding machines can be easily adapted by those skilled in the art to mold specific products by the process of this invention.

The solution entry gates should not be prematurely closed by coagulation of the solution, accordingly it is preferred to place the coagulation entry gate 4 and the filling gate a certain distance apart. In addition, the rate of solidification is a function of the area available for mass-transfer, length of the diffusion path and the volume of the mold cavity. Accordingly, it is preferable to design the coagulant entry gate of the mold with a large cross-sectional area by making a large portion of the cavity surface permeable to the coagulant and circulating the coagulating fluid around the permeable portions of the mold. This increases the rate of coagulation of the molded product and is closely analogous to cooling of an injection mold. To produce a higher quality product, however, slow coagulation of the solution is preferred to improve both the structure and mechanical properties of the molded hydrogel product.

The differences between the permeability and rate of diffusion of the coagulant and the solvent converts the mold cavity into a temporary osmotic cell. The osmotic pressure inside the cavity first increases to a maximum value, and then begins to decrease to a final value which depends on the swelling rate of the hydrogel. The decrease in osmotic pressure is caused by the diffusion of solvent from the mold into the surrounding coagulant. The semi-permeable coagulant entry gate plays a critical role in the range of osmotic pressure inside of the mold cavity. The semi-permeable material in the gate causes the difference between the rate of diffusion of coagulant into the mold cavity and the diffusion of solvent out of the mold cavity, resulting in the osmotic pressure peak inside the mold.

The solvents used in this invention must meet the aforementioned physical parameters of the coagulation process. Accordingly, the preferred solvents must have the following properties:

1. High polarity which is necessary to dissolve the polymer used in the process.
2. Miscibility with the coagulant (in most cases water).
3. A lower rate of diffusion through the coagulant entry gate than the coagulant.

There are a large number of solvents which meet the parameters described above, they include dimethylsulfoxide, dimethylformamide, gamma-butyrolactone, tetramethylenesulfone, ethylene carbonate, dimethylamino acetate, formic acid, among others. In the case of hydrogel polymer solution, the preferred coagulating fluid is water, but may also include any other aqueous fluid which coagulates the polymer. In the case of other polymers, the coagulating fluid may include acetone, alcohol, dioxane, halogenated hydrocarbons or other low molecular weight non-solvents for the particular polymer.

It is preferred that the solvents used in this invention are capable of maintaining the polymer in solution at relatively high coagulant (i.e. water) content. Accordingly, the capability of the solvent to dissolve the polymer decreases slowly with increasing water (or other coagulant) content. These preferred solvents include aqueous solutions of inorganic salts such as calcium thiocyanate, sodium thiocyanate, zinc chloride, lithium bromide, potassium iodide, and the like. Other preferred solvents include inorganic acids such as nitric acid, phosphoric acid, sulphuric acid or hydrofluoric acid. At high concentrations, aqueous solutions of these inorganic compounds are excellent solvents for any highly polar polymers.

It is believed that the active parts of the polymer solvents in these solutions are hydrated, non-ionized forms of the solvent which are present in high concentration in the concentrated aqueous solutions but which disappear due to ionization of the solvent as the solution is diluted with water or other water-miscible coagulant. In these solvents, the ionization and accordingly the quality of the solvent changes gradually as the solvent is diluted with water, allowing the physical network created by the coagulating polymer enough time to properly organize.

The preferred polymers from which to make the physically cross-linked hydrogels of this invention may have various compositions, however, all must have the following components:

1. Each polymer chain must have hydrophobic moieties which are long enough to make the polymer chain insoluble in water. The polymer chain segments must be somewhat rigid. Examples of preferred hydrophobic moieties useful for the physically cross-linked hydrogel polymers of this invention include sequences of acrylonitrile units; vinyl acetate units; vinylhalogen acetate units, such as vinyltrifluoroacetate; alkyl methacrylate units; polyurea and polyurethane which may include both aliphatic and aromatic sequences; and, organic esters of cellulose.

2. The polymers must have hydrophilic moieties, these formed by sequences which include hydrophilic groups such as oxyethylene; acrylamide; acrylic acid and salts of acrylic acids; vinylalcohol; maleic acid, vinylpyrrolidone; and other similar hydrophilic moieties. These hydrophilic groups must be organized in segments which are long enough to freely allow their hydration and allow high mobility of the polymers in the hydrated state.

A combination of these two types of moieties, hydrophilic and hydrophobic, in a single polymer sequence forms copolymers which are soluble in the polar solvents previously described, but which are insoluble in water. Solutions of these polymers with solvents coagulate upon contact with water or any other non-solvent to form the desired hydrogel. Polymers and copolymers which meet the requirements, outlined above, and which can be molded according to this invention include the following categories of polymers:

1. Hydrophilic derivatives of poly-acrylonitrile, such as multiblock copolymers of acrylonitrile, acrylamide, acrylic acid, which are manufactured by base-catalyzed or acid-catalyzed partial hydrolysis of polyacrylonitrile.

2. Hydrophilic derivatives of poly-acrylonitrile formed by partial alcoholysis, aminolysis or hydrazinolysis of nitrile groups.

3. Hydrophilic derivatives of poly-acrylonitrile formed by derivatisation of block copolymers of acrylonitrile and glutarimide.

4. Hydrophilic derivatives of poly-vinylacetate and polyvinylalcohol, such as partial hydrolyzates of polyvinyl acetate or partial acetals of polyvinylalcohol.

5. Hydrophilic grades of polyureas and poly-urethanes, containing long polyoxyethylene segments and-/or other hydrophilic moieties, such as carboxylic or amino groups.

6. Hydrogels based on polymer alloys composed of partially hydrolyzed styrene-malein anhydride alternating copolymers and a hydrophobic polymer, such as polyvinylacetate, polymethylmethacrylate or cellulose triacetate.

7. None-hydrophilic non-crosslinked soluble polymers such as polyacrylonitrile, cellulose triacetate, aromatic polyamides, and fully aromatic polyesters.

This list is not comprehensive but simply illustrative of the types of polymers which can be used in this invention. The method of this invention is truly a physical process and is readily adaptable to use with a broad range of hydrogels and highly polar polymers with physical networks, regardless of their specific chemical composition.

An especially preferred group of hydrogels which can be precision molded according to this invention are the metastable hydrogels, otherwise known as aquagels. Aquagels are water-swollen polymers which are formed by coagulation of their solution with water, in a similar manner as the true hydrogels described above. Like hydrogels, aquagels are physically cross-linked by interactions between the polymer chains, and they remain swollen as long as they are in contact with water or a water miscible liquid. Once aquagels are removed from contact with water they eventually dry out, permanently losing their swelling capacity, this is why they are called metastable hydrogels.

One example of an aquagel, or metastable hydrogel, is polyacrylonitrile which is slowly coagulated from a solution of highly polar solvents such as DMSO, DMF, aqueous solutions of zinc chloride or sodium thiocyanate. Another aquagel is cellulose triacetate, coagulated from a solution of acidic non-hydrolyzing solvents.

Both of these polymers form either porous, transparent or translucent metastable hydrogels (aquagels) with good mechanical properties and a water content ranging from about 50% to about 95% by weight, depending on the original composition of the polymer solution.

Coagulation of polymer solutions yields hydrogels with specific water content which vary for each polymer composition depending on the starting concentration of the particular polymer in the solution. The change in volume from the polymer solution to the hydrogel state is a function of the ratio of the concentration of polymer in a given volume of solution, and the concentration of the polymer in equal amounts of in the coagulated gel. Accordingly, the polymer solution can either expand, contract or maintain the same volume during coagulation, depending on the initial concentration of polymer in solution and the final water content of the coagulated hydrogel.

Figure 2:
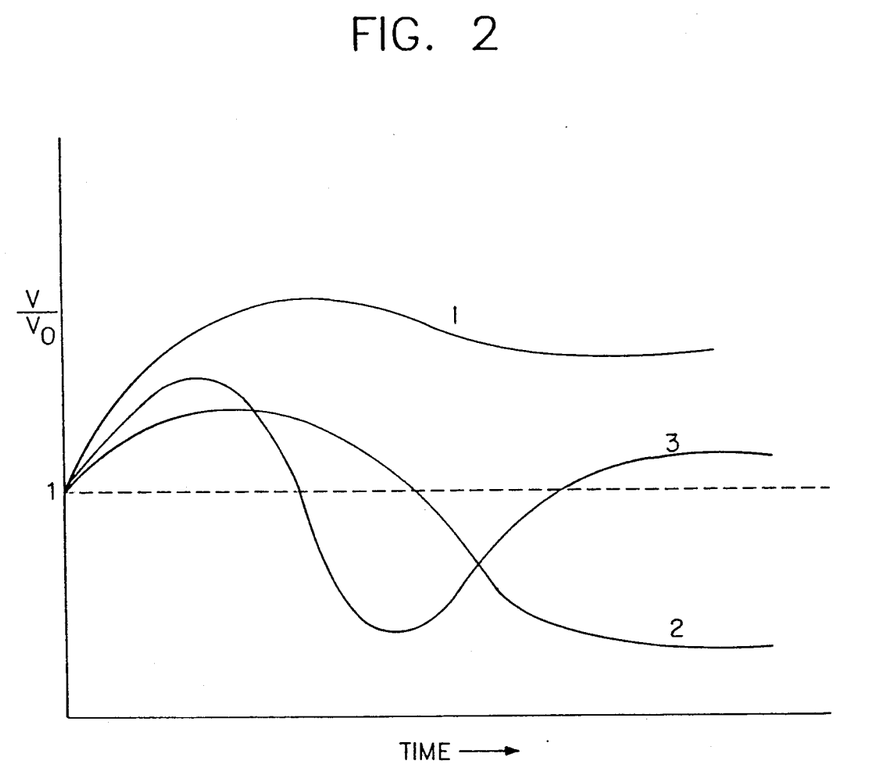
FIG. 2 is a graph illustrating the volume ratio of three polymer solutions coagulated over a period of time.

FIG. 2 graphically illustrates the changes in volume of various polymer solutions during coagulation when the polymer solutions are free to expand. The ratio of $V(t)/V_o$ plotted against the vertical axis, is defined as the volume ratio where $V(t)$ is the volume of the solution or aquagel at time t and, $V_o$ is the volume of the polymer solution at time $t=0$.

Curve 1 illustrates volume changes in a polymer solution in which the volume fraction of the coagulated hydrogel is less than the volume fraction of polymer in the starting solution. The polymer gradually expands to a maximum volume and than partially shrinks back to a lesser volume. The final volume of the product is larger than the volume of the mold cavity.

Curve 2 illustrates the case in which the volume fraction of the volume fraction of polymer decreases during coagulation. The volume of the solution initially increases during coagulation, and then sharply decreases below the initial volume of the solution so that the coagulated product has a smaller volume than the cavity.

Curve 3 illustrates changes in volume fractions of the polymer solution, in which the polymer has an ionic character and the solvent is an inorganic salt. For example, the polymer may include a block copolymer of acrylonitrile-acrylic acid dissolved in a concentrated solution of NaSCN. During coagulation there is an initial increase in volume, then the solidified hydrogel sharply decreases in volume due to the high concentration of the electrolyte, however, the volume later increases as the hydrogel's salt concentration diminishes.

The areas above which $V(t)/V_o=1$ correspond to times in which there is a positive pressure in the mold cavity. The position of maximum pressure and the scale used, varies depending on the polymer solution, geometry of the mold cavity, the shape and numbers of coagulant entry gates, the temperature and other conditions.

FIG. 2 shows that in all 3 cases, coagulation takes place under a positive pressure regardless of whether the final volume of the coagulated product is smaller or larger than the volume mold cavity. Anytime after coagulation and solidification has been completed, the mold can be opened and the product can be removed. The point at which coagulation has been completed corresponds to the peak in the volume fraction in all three curves. It is preferred that the mold is opened while the internal pressure exerted by the molded product is greater than or equal to zero, and to wash the molded product outside of the mold.

The method of this invention can also be used to prepare products having auxiliary covalent networks. The auxiliary covalent network does not contribute substantially to the mechanical strength of a physically crosslinked polymer. An auxiliary network, however, can impart or improve some of the properties of the hydrogel, including shape stability, shape memory or optical clarity. Examples of hydrogels with a dual physically crosslinked and covalently crosslinked networks are described by Janacek, et al., J. Polymer Sci., Symposium No. 53, 299 (1975). Other examples of a physically crosslinked hydrogel with auxiliary covalent networks are: polyvinylalcohol block copolymer which is post-crosslinked by toluendiisocyanate, and acrylonitrile-acrylamide crosslinked by glutaraldehyde.

The polymer solution can be covalently crosslinked inside of the mold cavity. The covalently crosslinked hydrogel is swollen by the solvent and then coagulated inside the mold cavity, in the manner described above, by absorption of water or other coagulant through the coagulant entry gate. The physical network formed by coagulation in addition to the covalently crosslinked network substantially increases the mechanical strength of the hydrogel product so that the coagulated article can be removed from the mold cavity without damage or distortion.

The crosslinking of the polymer solution in the mold cavity can be accomplished by chain-transfer, reaction of a polyfunctional crosslinking agent with the dissolved polymer, gamma-irradiation, or by other covalent crosslinking methods known to one of ordinary skill in the art. This invention, however, differs from the processes described in the prior art, in which the hydrogels are covalently crosslinked in the mold, to the coagulation steps in which physical crosslinks are formed by diffusion of water into the mold cavity accompanied by the escape of solvents out of the mold cavity, through the coagulation entry gate. This exchange of solvent for coagulant, coagulates, hardens and increases the volume and pressure of the coagulated hydrogel product inside the mold cavity prior to the cavity being opened.

Articles prepared by the method of this invention may also be covalently crosslinked outside of the mold cavity by various methods which are known by ones of ordinary skill in the art and therefore need not be described herein.

EXAMPLE 1

A copolymer containing acrylonitrile in a 55% molar concentration and acrylamide in a 45% molar concentration was prepared by partial hydrolysis of polyacrylonitrile dissolved in an aqueous solution of 65% nitric acid at room temperature. The 10% by weight solution of the copolymer in the nitric acid solution was coagulated directly using water as a coagulant to yield a hydrogel with a water content of about 70%. The coagulation of the solution was carried out on a glass petri dish by following three different procedures:

Procedure 1: The petri dish was filled with the polymer solution and immersed in an excess of water. The polymer solution coagulated immediately upon contact with water, forming a corrugated surface which contracted about a liquid core. After coagulation and washing was finished, the hydrogel product had an irregular corregated surface. The water content of the hydrogel product was approximately 75%, and the outside skin was softer and more hydrated than the interior bulk.

Procedure 2: The petri dish was filled with the same solution as the Procedure 1 and carefully covered with a porous ceramic lid so that there was no air trapped between the solution and the porous ceramic lid. The lid was presoaked with water, and the circumference of the lid making contact with the petri dish was sealed with a rubber gasket. The lid was held in place by a clamp equipped with piezoelectric pressure sensor. The covered dish which formed a closed mold was immersed in an excess of water. The internal pressure was monitored by the piezoelectric sensor. The pressure increased gradually and then started to decrease. When the pressure began to decrease, the mold was opened and the hydrogel product inside the mold was carefully removed. The coagulated solution formed a circular hydrogel disk which was washed outside of the mold until it reached a neutral pH. Washing caused the disk to increase slightly in size and then contract to a final size which was smaller than the mold cavity. The final disk was homogeneous and free of distortion.

Procedure 3: Procedure 2 was repeated, except that the mold was not opened until the pressure registered on the piezoelectric pressure sensor decreased to zero. The disk was removed from the mold and washed until it reached a neutral pH. Washing the hydrogel disk caused it to contract into its final size without distortion. The clear, flexible hydrogel disk had the same dimension as the disk from Procedure 1 and the water content of 70%. However, this disk was somewhat stronger then the disk obtained in Procedure 2.

Procedure 4: Procedure 3 was repeated, however, the pH of the water outside of the mold measured every several hours and the water was replaced until a neutral pH reading was achieved. After neutralization, the mold was opened. The molding cavity contained a hydrogel disk in the same shape and dimension as the disks obtained in Procedures 2 and 3, after those disks were fully washed. The water content of the hydrogel disk was about 70% and the disk occupied approximately 50% of the volume of the molding cavity, the other 50% was occupied by water.

EXAMPLE 2

Procedures 1 and 4 described in Example 1 were repeated using a solution of cellulose triacetate (CTA), with a acetyl content over 42%, in a 95% formic acid aqueous solution. The concentration of CTA in the solution was about 10% by weight. The mold containing the solution was immersed in chilled water at a temperature of 5 to 10° C. The solution coagulated and was washed until a neutral reaction was achieved.

The product achieved as a result of Procedure 1 has a distorted, slightly hazy with an irregular surface, and had a water content of approximately 83% by weight.

The product achieved as a result of Procedure 4 was a regular, smooth disk with a water content of about 79% by weight. The disk was stronger, more resilient and clearer than the product achieved according to Procedure 1.

When dried, both disks collapsed to rigid, somewhat distorted shapes of yellowish masses which did not swell when immersed in water.

EXAMPLE 3

Polyacrylonitrile (PAN), MW=150,000 was dissolved in dimethylsulfoxide (DMSO) to form a 20% PAN solution. The PAN solution was heated to decrease its viscosity and poured into the molds described in Example 1.

The product achieved as a result of Procedure 1 was a distorted, porous article with layers of weak polymers including water-filled pockets on the inside of the product.

The polymer achieved as a result of Procedures 2 was a rubbery disc, which when removed from the molding cavity and washed resulted in a tough, translucent disk with a 66% water content. The water content, shape and dimension of the disk remained stable for over 12 months as long as the disk was immersed in water. As in Example 2, once the disk was dried it would not reswell in water.

EXAMPLE 4

Alternating copolymer of styrene-maleic anhydride was prepared by free radical copolymerization of the respective monomers in 2-butanone solution. The anhydride units were then partially hydrolyzed by addition of water and KOH and the mixture was stirred at elevated temperatures. A polyvinyl acetate solution in 2-butenone was mixed into the solution described above and the mixture was simultaneously stirred and heated under reflux conditions. The reaction was completed when the solution coagulated into a clear gel without obvious separation of polymer phases. The water content of the gel was approximately 80%.

The mold solution was poured into an open petri dish and immersed in an excess of an acetone-water coagulant mixture. The gel coagulated and the coagulated hydrogel was washed thoroughly in water. The washed coagulated hydrogel was distorted with irregular surfaces, which was similar to the gels obtained according to Procedure 1 of Examples 1–3.

The same gel solution was poured into the mold with a porous lid described in Procedure 2 of Example 1. The mold was placed in an excess of acetone-water coagulation mixture until the internal pressure of the mold was approximately zero. The mold was then soaked in water for 24 hours, opened, and the hydrogel disk formed inside the mold was washed until all solvents were removed.

EXAMPLE 5

Figure 3:
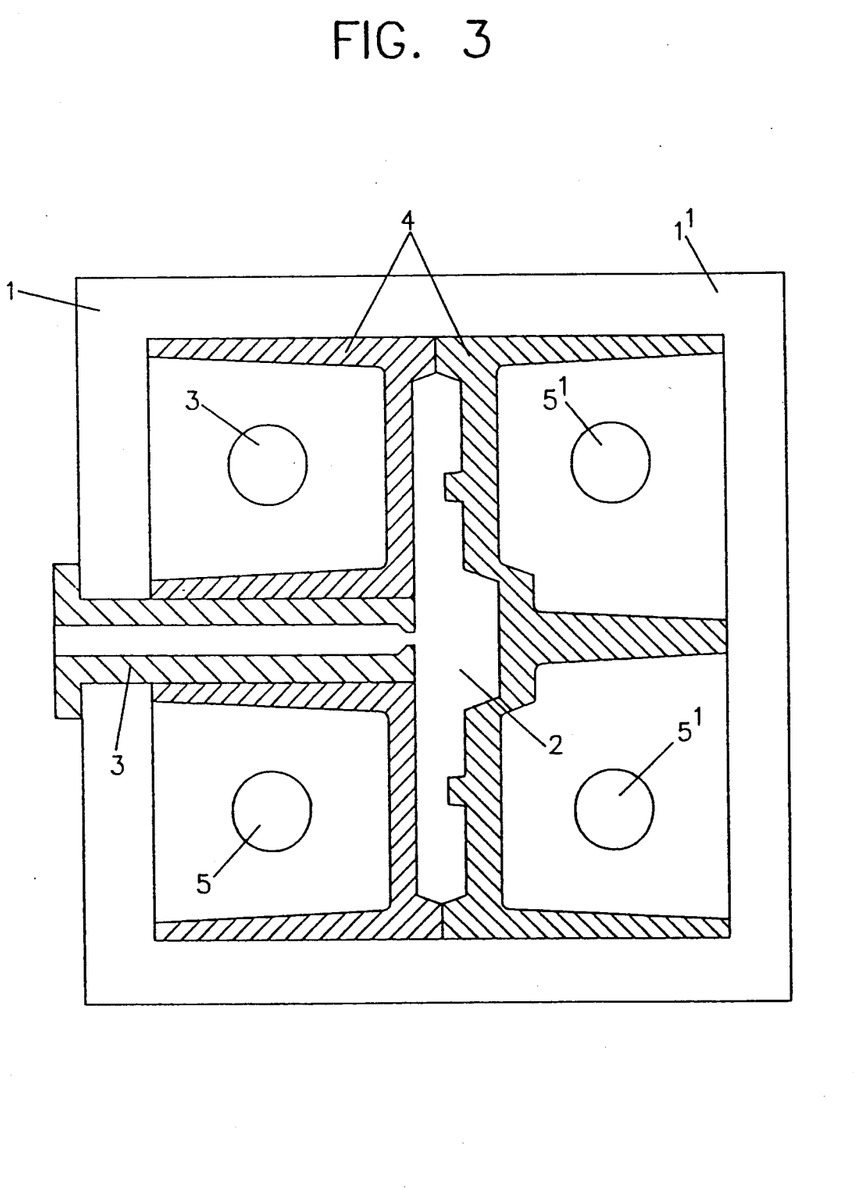
FIG. 3 is a top plan view of a horizontal cross-section through an injection molding dye which can be used with this invention.

The injection molding dye illustrated in FIG. 3 has ceramic inserts with internal cavities shaped as parts for a toy. As shown in cross-section, the mold includes outside portions 1 and $1^1$, mold cavity, filling gate 3, porous ceramic inserts 4, $4^1$ and coagulated entry gate 5, $5^1$. The filling gates, runners and other parts of the cavities which were not parts of the ceramic inserts were made from stainless steel.

A water cooling system was built into the injection molding machine and was contiguous with the ceramic inserts. The filling system was arranged so that water was in contact with all porous ceramic parts from the outside of the mold cavity, but could not penetrate into the mold cavity without first passing through the pores of the ceramic inserts.

The copolymer solution prepared in Example 1 was coagulated in an excess of water and the excess solvents were thoroughly washed from the coagulated product. The coagulated polymer was then dried, ground and dissolved in DMSO in a heated high-shear blender to form a highly viscous solution containing 25% by weight of the copolymer. The viscous solution was coagulated directly in water, the coagulated hydrogel had a distorted shape and an uneven surface similar to the product described in Procedure 1 of Example 1.

The viscous 25% by weight copolymer solution, prepared above, was diluted with glycerol in the heated high-shear blender while under mixing conditions until the final concentration of glycerol in the solution was about 15%. The homogeneous glycerol-copolymer solution was poured onto a glass surface to form a layer which gelled as it cooled ti room temperature. The gel layer was cut into ribbons which were fed into an injection molding machine equipped with the mold illustrated in FIG. 3. The machine melted the gel ribbons at approximately 120° C. and injected the melted polymer into the mold cavity. Tap water circulating around the ceramic inserts entered the mold by diffusion and coagulated the molten polymeric gel. The molding cycle lasted for approximately 30 seconds. The mold was opened and a flexible, strong and easily handable coagulated polymer product was ejected from the mold and washed in a tank of water.

As a control the same strips of gel were molded in the customary injection-molding manner, by solidifying the polymeric gel by cooling in a mold cavity which did not include the semipermeable gates for the diffusion of water. The resulting molded polymeric product was too weak to be ejected from the mold cavity without damage and stuck to the walls of the mold. The washed product was highly distorted and could only be produced in low yields.

EXAMPLE 6

A polyurethane polymer was prepared by melting the following components in a container: 822.3 parts CARBOWAX 6000 ®, a polyethylene glycol having average molecular weight of 7,500, manufactured by Union Carbide Corporation, New York, N.Y. 10017; 23.0 parts of diethylene glycol; 5.4 parts water; and, 149.7 parts of methylene bis-cyclohexyl-4,$4^1$-m, isocyanate, a product identified as DESMODUR W ® by the Mobay Chemical Corporation, Penn Lincoln Parkway West, Pittsburgh, Pa. 15205. The mixture was stirred in the container at 75° C. for 15 minutes until it was homogeneous, cooled to 50° C. and then diluted with 2.0 parts by volume of dibutyl tin dilaurate, an organic tin catalyst solution identified as $T_{12}$ manufactured by Metal and Thermite Company of Rahway, N.J. Once the tin catalyst solution was added to the reaction mixture, the mixture was allowed to undergo an exothermic reaction, heating from a temperature of 50° C. to approximately 75° C. The molten product was poured at a temperature of 75° C. into Teflon coated polypropylene pans and heated in an oven at 100° C. in order to complete the reaction and form a solid hydrophilic polyurethane resin.

The polyurethene resin was dissolved in dimethylformamide to form a 10% polyurethene solution. 2.5 grams of diethylene glycol diacrylate and 0.1 gram of isobutylperoxyoctoate was added for every 1000 grams of the 10% solution, and stirred thoroughly. The mixture was then poured into the two-piece polypropylene mold illustrated in FIG. 1, in a sufficient quantity to cause the overflow at coagulant entry gate 4. The mold was then heated in a closed container to 100° C. for 90 minutes in order to achieve crosslinking. The closed container was required so that the DMF did not excessively evaporate during the molding process. The mold was then cooled and immersed in an excess of water for 24 hours, the mold parts were maintained in contact under moderate pressure from a flexible clamp. After 24 hours the mold was opened and the overflow separated from the lens formed by the molding process. The contact lens formed by this process was washed in water and then equilibrated with isotonic saline. The contact lens had a high water content, good shape stability and memory.

EXAMPLE 7

A water insoluble, water-swellable multiblock copolymer of acrylonitrile with acrylamide and sodium acrylate was prepared in powder form and dried at 80° C. A 10% solution was prepared by dissolving the dried powder in aqueous 49% sodium thiocyanate solution prepared in deionized water. The mixture was heated to 80° C. for two hours until it dissolved forming the 10% solution of the copolymer. The solution was then stirred for another 3 hours and filtered through a 10 micron filter at a pressure of 30 PSI. The filtered solution was directly transferred into a clean container to avoid contamination. The viscosity and refraction index of the solution were measured.

The male part 2 and female part 1 of the polystyrene contact lens mold illustrated in FIG. 1 were removed from their protective wrappings and cleaned with compressed air. Several female parts 1 were lined on a glass plate and approximately 0.5 g of the solution was poured into the female parts 1, carefully avoiding the formation of bubbles. The male parts 2 were placed on the female parts 1 and pressed against female parts 1 while turning female parts 2 until the excess of the solution poured out of the mold, to form the coagulant entry gates, illustrated in FIG. 1. A second glass plate was placed on top of the male parts 2 of the mold and weighted so that each mold was being compressed by force of approximately 200 g. Then the molds pressed together between the two glass plates were placed in a container which was flooded with 0.9% aqueous NaCl solution, fully immersing all molds.

After 10 hours the saline was drained from the container and the top glass plate was removed. A slight pressure of approximately 100-200 grams was applied to each mold and the female parts 1 were rotated against male parts 2 in order to allow the circumferential edges 5 of female parts 1 to cut off the flash. Each mold was then opened and the coagulated lenses removed using a suction cap. Each lens was washed in a 0.9% solution of NaCl in deionized water. The NaCl deionized water solution was frequency changed until all thiocyanate remaining in each lens was completely removed. The transparent contact lenses were precise replica of the molds and had a water content of approximately 91.9%.

While the invention has been described with reference to the specific methods and compositions recited in the descriptions and examples, it will be appreciated by those of ordinary skill in the art that various modifications may be made to the methods and compositions of this invention without departing from its spirit and scope.

We claim:

1. An apparatus for precision molding of polymers to form a precisely shaped product, comprising:

molding cavity for receiving a solution of the polymer; and, means for introducing coagulating fluid into said molding cavity while preventing the escape of said polymer solution from said molding cavity, whereby said polymer solution may be coagulated by the influx of a coagulating fluid into said polymer solution, which coagulating fluid would cause both the coagulation and swelling of the polymer solution so as to mold said polymer solution under pressure in said molding cavity into a precisely shaped product, and wherein said means for introducing a coagulating fluid into said molding cavity is a semipermeable gate capable of allowing the diffusion of a coagulating fluid into the molding cavity at a faster rate than the rate of diffusion of the solvent out of the molding cavity.

2. The apparatus of claim 1 wherein said semipermeable gate includes a layer of said polymer solution coagulated and swollen by said coagulating fluid.

3. The apparatus of claim 2 wherein said layer of polymer is formed by the coagulated overflow of said polymer solution from said molding cavity.

4. The apparatus of claim 3, further comprising a mold including a first female part having an indentation for forming said molding cavity and a sharp circumferential edge surrounding said indentation; and, a male part adapted to contact said sharp circumferential edge to form the molding cavity between the indentation of the female part and said male part.

5. The apparatus of claim 4 wherein the area of contact between said female part and said male part includes a surface extending from said sharp circumferential edge for the formation of said coagulant entry gate.

6. The apparatus of claim 5, further including holding means for holding said male part to said female part forming said cavity therebetween and imparting a selected force between said female part and said male part.

7. The apparatus of claim 5 wherein said molding cavity includes a shape for molding a contact lenses.

8. The apparatus of claim 1 wherein said semipermeable gate includes a porous solid material.

9. The apparatus of claim 8 wherein said porous solid material comprises at least part of said mold extending from said molding cavity to a place for contacting said coagulating fluid.

10. The apparatus of claim 9 wherein said mold includes means for circulating said coagulating fluid past said semipermeable gate.

11. The apparatus of claim 10 wherein said mold includes a molding cavity shaped in the form of a contact lens.

* * * * *